United States Patent [19]

Brau et al.

[11] 4,287,488
[45] Sep. 1, 1981

[54] RF FEEDBACK FREE ELECTRON LASER

[75] Inventors: Charles A. Brau; Donald A. Swenson; Thomas J. Boyd, Jr., all of Los Alamos, N. Mex.

[73] Assignee: The United States of America as represented by the United States Department of Energy, Washington, D.C.

[21] Appl. No.: 90,846

[22] Filed: Nov. 2, 1979

[51] Int. Cl.³ .......................... H01S 3/09; H01S 3/14
[52] U.S. Cl. .............. 331/94.5 PE; 330/4.3; 331/94.5 C
[58] Field of Search ............... 331/94.5 P, 94.5 PE, 331/94.5 C; 330/4.3

[56] References Cited
U.S. PATENT DOCUMENTS

| 3,822,410 | 7/1974 | Madey | 331/94.5 PE |
| 4,189,686 | 2/1980 | Brau et al. | 331/94.5 PE |

FOREIGN PATENT DOCUMENTS 2005909  4/1979  United Kingdom ............. 331/94.5 PE

OTHER PUBLICATIONS

Potter et al., IEEE Trans. Nucl. Sci. NS 26, 3763 (1979).
Schriber et al., Proc. 1972 Proton Linear Accel. Conf., Oct. 10-13, 1972.
Neal, "Stanford Two-Mile Linear Accelerator", (Benjamin, Inc., New York, 1968), pp. 241-271.
Pering et al., IEEE Trans. Nuc. Sci. NS 16, 1-5 (1969).
Mavrogenes et al., IEEE Trans. Nuc. Sci. NS 20, 919-922 (1973).
Hoyt et al., Rev. Sci. Instruments, 37, 755-762 (1966).
Nagle et al., Rev. Sci. Instruments 38, 1583-1587 (1967).
Knapp et al., Rev. Sci. Instruments 39, 979-991 (1968).
Manca et al., IEEE Trans. Nuclear Sci. NS 24, 1087-1090 (1977).
Segall, "Free Electron Lasers for Laser Fusion", Topical Meeting, Inert Confinement, Feb. 1978.
Elias, Phys. Rev. Lett. 42, 977-981, Apr. 9, 1979.
Deacon et al., Phys. Rev. Lett. 38, 892-894 (1977).
McDermott et al., Phys. Rev. Lett. 41, 1368-1371 (1978).
Klystrons and Microwave Triodes, Hamilton et al., (McGraw-Hill, N.Y., 1948).

*Primary Examiner*—William D. Larkins
*Attorney, Agent, or Firm*—William W. Cochran, II; Paul D. Gaetjens; Richard G. Besha

[57] ABSTRACT

A free electron laser system and electron beam system for a free electron laser which use rf feedback to enhance efficiency. Rf energy is extracted from an electron beam by decelerating cavities and returned to accelerating cavities using rf returns such as rf waveguides, rf feedthroughs, etc. This rf energy is added to rf klystron energy to lower the required input energy and thereby enhance energy efficiency of the system.

8 Claims, 6 Drawing Figures

RF FEEDBACK FREE ELECTRON LASER

BACKGROUND OF THE INVENTION

1. Field of the Invention

The present invention pertains generally to lasers and more particularly to free electron lasers. It is a result of a contract with the DOE (contract W-7405-ENG-36).

2. Description of the Background

Since the concept of the first laser was demonstrated, the scientific community has had great interest in the development of a high power laser which can be continuously tuned over a wide range of frequencies. A high power laser which could be tuned in this manner would have great utility for industrial chemistry applications to supply energy to specific reactions. For example, such a laser could be used as a source to clean exhaust gases from combustion by selectively decomposing noxious substances. Similarly, one could purify the feed stocks for chemical processes by selective destruction of contaminates. For example, coal gasification can be accomplished using a high power continuously tunable laser to remove impurities which would adversely affect catalysts used in the gasification process.

With the advent of the gaseous molecular laser, high powers were achievable. However, gaseous molecular lasers are incapable of being tuned over more than a very restricted range of frequencies, and produce only a specific set of frequencies depending upon the gaseous lasing medium.

The concept of extracting coherent optical radiation from a stream of relativistic electrons, i.e. the free electron laser, was first described by J. M. J. Madey, of Stanford, in 1971. Just two years ago, J. M. J. Madey et al. reported lasing action from stimulated bremsstrahlung from the Stanford Linear Accelerator (SLAC) as reported in Phys. Rev. Letts., 38 892 (1977). A collaborative effort by the Columbia University Laboratory and the Naval Research Laboratory has produced a laser based on stimulated Raman scattering by free electrons as reported by D. B. McDermott et al., Phys. Rev. Letts., 41 1368 (1978). The report of these results of the "free electron laser" has caused much excitement in the scientific community since it is possible that free electron lasers will be able to produce exceedingly high powers at low cost and continuously tunable frequency.

In addition to the continuously tunable frequency and potentially high output powers obtainable from the free electron laser, the free electron laser has the added advantage of the absence of a lasing medium, such as fluid, glass, or gaseous molecules, which tend to limit power and spatial resolution by nonlinear optical effects in the lasing medium.

However, to date only low efficiencies have been demonstrated or envisioned from the various free electron laser systems proposed having wavelengths shorter than the near IR. Consequently, tremendous energy is required to operate free electron lasers at short wavelengths (e.g., $\lambda \lesssim 1$ $\mu$m) and high output powers, necessarily affecting utilization of these devices in industrial applications and other areas.

The d.c. accelerator/decelerator concept described by L. R. Elias, Phys. Rev. Letts. 42, 977 (1979) does achieve good efficiencies at longer wavelengths (e.g. $\lambda \gtrsim 10$ $\mu$m). However, many industrial applications as well as other applications require shorter wavelengths for operation.

STATEMENT OF THE OBJECTS

It is therefore an object of the present invention to provide an improved free electron laser.

It is also an object of the present invention to provide a high efficiency free electron laser.

Another object of the present invention is provide a free electron laser which is reliable in operation.

Another object of the present invention is to provide a free electron laser capable of producing high output powers at high efficiencies.

Another object of the present invention is to provide an improved electron beam power system for a free electron laser.

Other objects, advantages and novel features of the present invention will become apparent to those skilled in the art upon examination of the following detailed description of the preferred embodiment of the invention and the accompanying drawings.

SUMMARY OF THE INVENTION

The present invention overcomes the disadvantages and limitations of the prior art by providing an improved free electron laser. The free electron laser of the present invention utilizes energy recovery in the form of microwave energy generated in the decelerating cavitites to supply energy to electron beam accelerating cavities to enhance overall efficiency of the system.

The free electron laser of the present invention, which uses an electron beam to generate coherent photons in response to interaction with a periodic magnetic field, combines means for decelerating the electron beam in rf decelerator cavities to produce a rf signal, and means for guiding the rf signal to a rf accelerator to reduce rf energy required to accelerate the electron beam by an external rf power source and thereby enhances efficiency of the free electron laser.

DETAILED DESCRIPTION OF THE PREFERRED EMBODIMENT OF THE INVENTION

Figure 1:
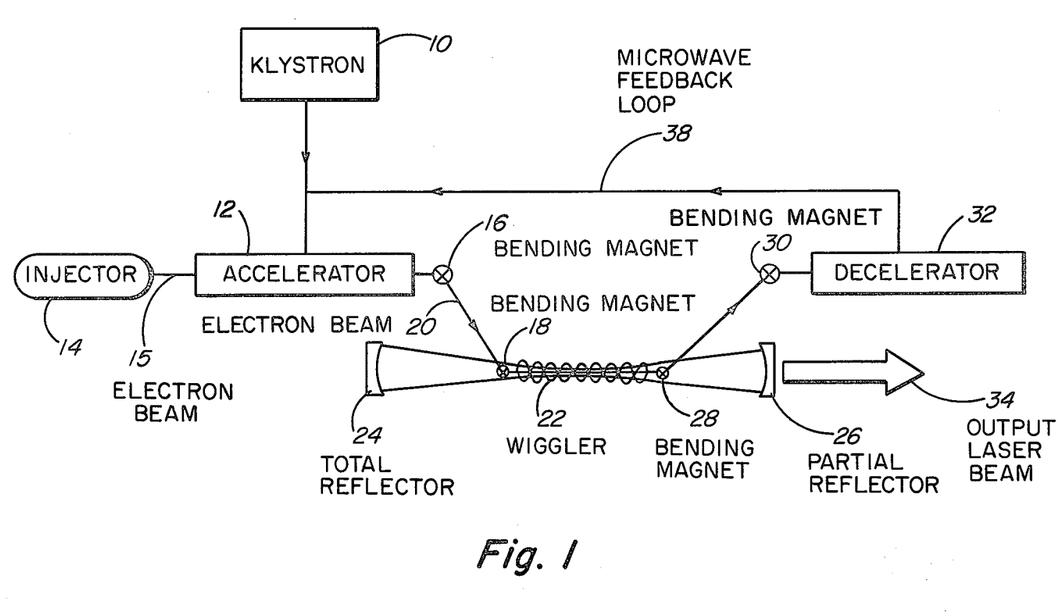
FIG. 1 is a schematic illustration of one embodiment of the present invention utilizing a microwave feedback loop.

FIG. 1 schematically illustrates a free electron laser utilizing a microwave feedback loop in accordance with the present invention.

The present invention uses radio-frequency (rf) linear accelerator technology wherein a rf signal, typically a microwave signal, produces an electro-magnetic field in various cavity configurations to accelerate the electrons to relativistic velocities. This technology is well understood and relatively inexpensive to implement in comparison to induction accelerators, diode accelerators, etc., for the purposes of the present invention. Also, rf accelerators can be scaled to extremely high average powers utilizing present technology. Additionally, rf accelerators have high reliability and can be operated for extended periods without shutdown. Furthermore, rf accelerators do not depend upon unreliable high power pulse switching circuitry for operation, which limit utility of other laser systems.

The present invention operates in CW mode which reduces the occurrence of mirror damage and atmospheric breakdown. Moreover, enhancement of the peak laser flux above the CW value is achieved inherently in the rf accelerator of the present invention by taking advantage of the micropulse structure of the e-beam. In this way, the laser flux is compressed into very short, intense bunches, i.e., 50 to 100 picoseconds, which enhances laser operation due to its pulsed nature while precluding mirror damage and atmospheric breakdown due to its short period.

Referring again to FIG. 1, klystron 10 generates microwave rf energy in the conventional manner as taught by the text entitled "Klystrons and Microwave Triodes" by Donald R. Hamilton, Julian R. Knipp, J. B. Horner Kuper, McGraw-Hill Book Company, Inc., New York 1948.

The rf energy generated by Klystron 10 is applied to accelerator 12 which functions to accelerate the electron beam 15 produced by injector 14. The accelerator 12 can comprise any number of rf driven accelerators such as the cavities disclosed in "Computer Designed 805 MHz Proton Linac Cavities" by Harry C. Hoyt et al., disclosed in the Rev. of Sci. Instrums., vol. 37, No. 6, pp. 755-762, June 1966, "Coupled Resonator Model for Standing Wave Accelerator Tanks" by D. E. Nagle et al., Rev. of Sci. Instrums., vol. 38, No. 11, pp 1538-1587, November 1967, and "Standing Wave High Energy Linear Accelerator Structures" by E. A. Knapp et al., Rev. of Sci. Instrums., vol. 38, No. 7 pp. 979-991, July 1968, or, the disk and washer structure such as disclosed in "High Energy Accelerator Structures for High Gradient Proton Linac Applications" by J. J. Manca, IEEE Transactions on Nuclear Science, vol. NS 24, No. 3, June 1977 and "Experimental and Calculated RF Properties of the Disk and Washer Structure" by J. M. Potter et al., IEEE Transactions on Nuclear Science, vol. NS 26, No. 3, June 1979. Of course, any suitable rf accelerator for accelerating multiamp (peak current) electron beams can be used in accordance with the present invention, such as the cavity structure disclosed in the article entitled "Beam Test With S-Band Standing Wave Accelerators Using On-Axis Couplers" by S. O. Schriber et al. appearing in Proceedings of 1972 Proton Linear Accelerator Conference, Oct. 10-13, 1972.

Injector 14 of FIG. 1 comprises any suitable injector which produces multiamp currents, such as that utilized in the Stanford Linear Accelerator (SLAC) as disclosed in the test "The Standford Two-Mile Accelerator" by R. B. Neal, W. A. Benjamin Inc., New York 1968 in chapter 8, *Injector* pp. 241-271. Similarly, the injectors disclosed in the articles entitled "Performance of 140 MeV High Current Short Pulse Linac at ORNL" by N. C. Pering et al. appearing in IEEE Transactions on Nuclear Science, vol NS 16, no. 3, June 1969 and "Sub-nanosecond High Intensity Beam Pulse" by G. Mavrogenes et al. appearing in IEEE Transactions on Nuclear Science, vol. NS 20, n. 3, June 1973, disclose other suitable injectors for use in accordance with the present invention.

For the design of a laser for producing 1 micron laser wavelength radiation, electron beam energy produced at the output of the accelerator 12 can be conveniently designed to produce 100 MeV and $\gamma = 200$. This conveniently requires a wiggler period of approximately 4-8 cm. for a 1 $\mu$m laser wavelength. Although low average currents are necessitated from the accelerator when a higher energy beam is produced, longer and costlier accelerator structures, longer wigglers and longer laser cavities are required for higher electron beam energies. The average current of 1.6 amps needed for an average output power of 10 MW at 1 micron wavelength is readily produced by injector 14. The klystron generates a microwave frequency of 358 MHz for which 0.5 MW CW klystrons are readily available, off the shelf. Additionally, 358 MHz provides a large accelerator structure for efficient cooling.

An injection phase angle spread of 11.5° is used to produce an electron energy spread of approximately $\pm 0.25\%$. This electron energy spread is satisfactory for adiabatic capture of the electron beam by the free electron laser. Subharmonic injection (one pulse every 5 cycles of the microwave field) is used to compress the laser and electron beams into fewer, more intense bunches. In this manner, the peak current is increased to 250 A, corresponding to 3.5 kA/cm² when focused to 3 mm diameter, to increase the laser gain and correspondingly the output coupling. At the same time, the laser flux is compressed by two orders of magnitude to approximately $2 \times 10^9$ W, peak, which corresponds to $3 \times 10^{10}$ W/cm² when focused. This high flux makes it possible to reduce the wiggler length.

Electron beam 20 produced by accelerator 12 is directed through the wiggler 22 via bending magnets 16 and 18. Wiggler 22 generates a rippled magnetic field which can be produced by a helical coil such as disclosed by D. A. G. Deacon et al., Phys. Rev. Letts., 38, 892, (1977) or by a set of rings that carry current in alternate directions such as disclosed by D. B. McDermott et al., Phys. Rev. Letts., 41, 1368 (1978), or by suitable arrangements of permanent magnets.

The period of the wiggler and the energy of the electrons determine the frequency produced by the free electron laser. The nominal relationship between the wiggler wave number ($k_w$) and the optical (signal) wave number ($k_s$) is:

$$k_w = k_s(1 + e^2 B^2/m^2 c^2)/2\gamma^2,$$

which is called the resonance condition. An electron beam moving through a wiggler satisfying the resonance condition will not emit any radiation, but will bunch at the optical wavelength. If the wiggler wave number is slightly lower than the resonance condition, the electron beam will both bunch and radiate, thereby increasing the energy of the radiation field. For a single pass free electron laser such as disclosed in FIG. 1, the most efficient approach utilized is one in which the wiggler wave number and the field are varied in such a way as to "trap" a significant number of electrons in a potential well and decelerate them coherently. This is achieved by using a wiggler which has a decreasing spatial period wherein the distance between each successive magnetic field is "tuned" to the energy of the electron exiting the preceeding magnetic field. Since each set of magnetic field lines extracts energy from the electrons, successively shorter spatial periods of the magnetic fields are used to coherently decelerate the electrons in the "tapered wiggler." Such a "tapered wiggler" is capable of easily extracting 5% of the energy of the beam. Such results are readily achievable with a longitudinal momentum distribution of ±0.25%. More importantly, the distribution function emerging from the wiggler is compatible with the decelerator 32 which is used to recover beam energy as set forth below.

Total reflector 24 and partial reflector 26 define the optical cavity of the free electron laser. Similarly, the negative branch unstable resonator shown in FIG. 4 can be utilized in accordance with the present invention to generate output laser beam 34. Similarly, other suitable optical resonators can be used to provide the desired optical output signal, such coupled stable resonators, ring resonators, resonators using partially transmitting optics, or dispersive optics, such as gratings, etalons, etc.

Reflectors 24 and 26 function to couple the laser beam and the electron beam by forming a long narrow focal region while simultaneously spreading the beam over a large area at the mirror surfaces to keep the incident flux from damaging reflectors 24 and 26. For reflectors having 99% reflectivity and an allowable heat load of 2 kW/cm$^2$, the maximum incident flux load is 200 kW/cm$^2$. Since the peak laser flux is approximately 150 times higher due to subharmonic injection, the peak flux is 30 MW/cm$^2$. For 86 picosecond pulses, peak intensity is not a problem.

Figure 2:
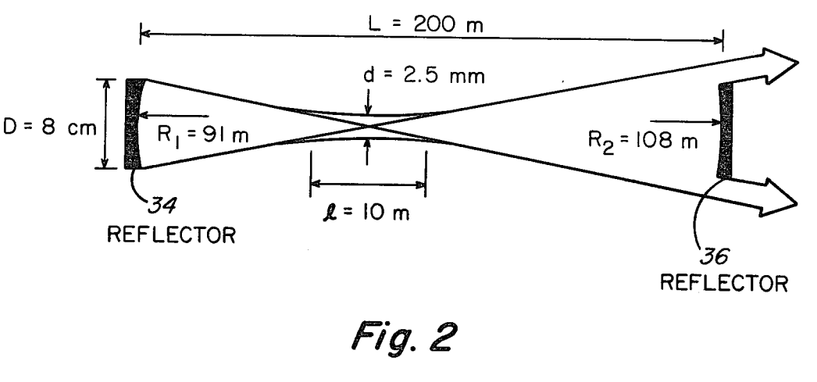
FIG. 2 is a schematic illustration of an unstable resonator which can be used in accordance with the present invention.

Referring to FIG. 2, reflector 34 and reflector 36 have a diameter of 8 cm and radius of 91 m and 108 m, respectively. Utilizing a 10 MW laser with 50% output coupling, the total power incident on the output coupler is 10 MW, corresponding to 200 W/cm$^2$ on the surface of reflectors 34 and 36. To maximize the length of the focussed region, the overall length of the cavity (200 m) is made as large as possible. The focal region produced is approximately 10 m for a diameter of 2.5 mm for which the electron beam and laser beam interact.

Referring again to FIG. 1, bending magnets 28 and 30 direct the electron beam to decelerator 32. The decelerator structure is quite similar to that of the accelerator, and can comprise the same structures utilized as disclosed for accelerator structures. The decelerator 32 functions to decelerate the electrons emerging from the wiggler to a low energy and thereby convert their kinetic energy to rf energy. The wiggler extracts energy from the electron beam 20 so that the electron momentum distribution emerging from the wiggler consists of 2 peaks, one at the wiggler decelerated energy containing nearly 80% of the electrons, and another at the original energy containing most of the remaining particles. The decelerator 32 is tuned to decelerate the main group of electrons to extract a major portion of energy from the electron beam emerging from wiggler 22. In this manner, the electron momentum distribution of the electron beam emerging from wiggler 22 is compatible with the decelerator concept. If desired, the other group of electrons (emerging from the FeL at the original energy) can be further decelerated in a second linac structure to recover additional energy. The rf energy generated by decelerator 32 is then channeled by microwave feedback loop 38, comprising a conventional microwave waveguide, to the input of accelerator 12, thereby recovering a substantial portion of energy from the electron beam not extracted by wiggler 22.

Considering typical efficiencies of the various devices of the system, an overall efficiency of as much as 24% is achievable.

Figure 3:
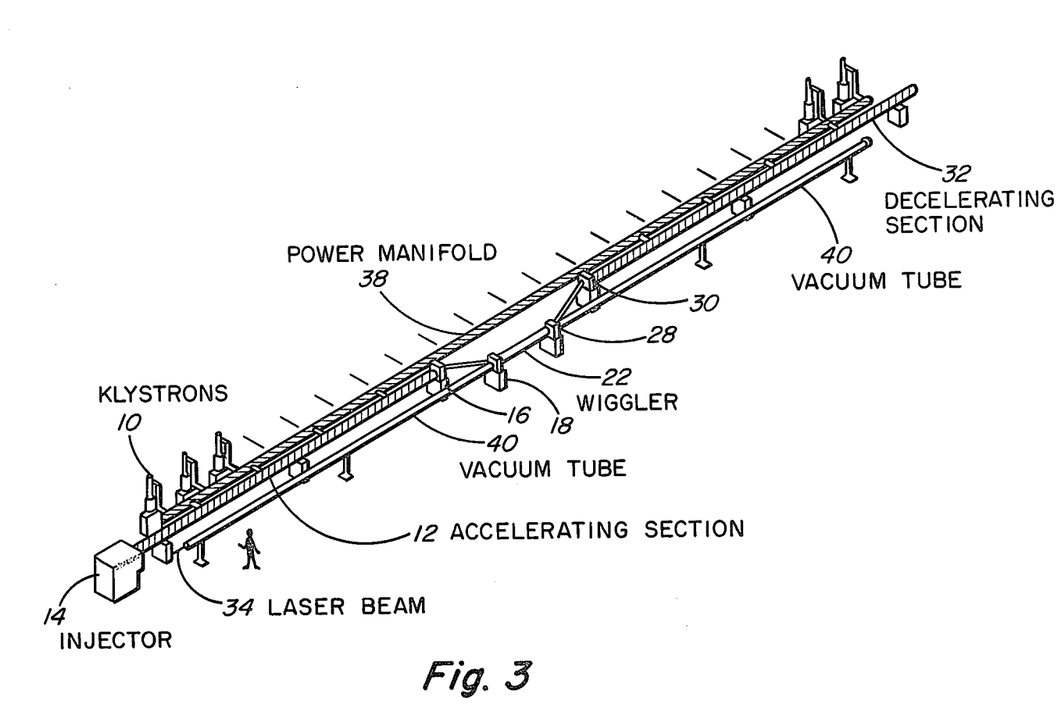
FIG. 3 is a perspective view illustrating implementation of the embodiment of FIG. 1.

FIG. 3 diagramatically discloses the various elements designed in accordance with the schematic illustration of FIG. 1. As shown, a power manifold 38 is used to couple klystrons 10 to accelerating section 12 and decelerating section 32. Vacuum tube 40 is used to transmit the laser photons between total reflector 24 and output reflector 26. Similarly, the reflectors of FIG. 2 can also be used in the diagram of FIG. 3.

Figure 4:
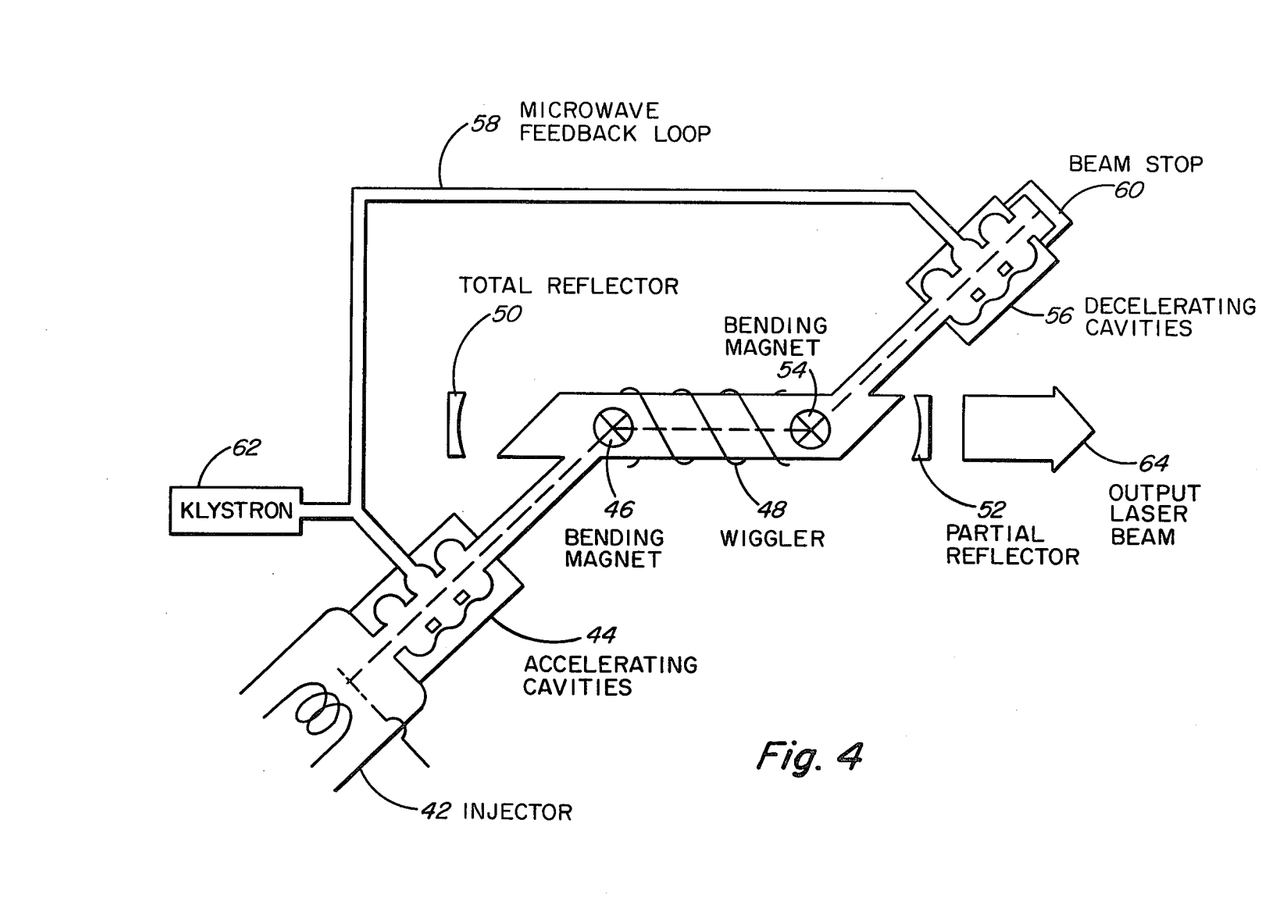
FIG. 4 is a schematic diagram illustrating an alternative embodiment of the present invention utilizing a microwave feedback loop.

FIG. 4 illustrates an alternative embodiment in accordance with the present invention. As shown, the device of FIG. 4 is similar to the device of FIG. 1. Injector 42 produces electrons which are accelerated by accelerating cavities 44. The electron beam produced by accelerating cavities 44 is bent by bending magnet 46 and directed through wiggler 48 between the total reflector 50 and partial reflector 52 forming the laser cavity. Bending magnet 54 then directs the electron beam towards decelerating cavities 56 which extract energy from the beam. The extracted energy is channeled back to accelerating cavities 44 via microwave feedback loop 58. Beam stop 60 stops any electrons which are not decelerated by decelerating cavities 56. The rf energy recirculated in feedback loop 58 is added with rf energy produced by klystron 62 for application to accelerating cavities 44. The advantage of the configuration of FIG. 4 is that two bending magnets 46 and 54 are required to direct the electron beam, whereas four bending magnets are required in the configuration of FIGS. 1 and 3.

Figure 5:
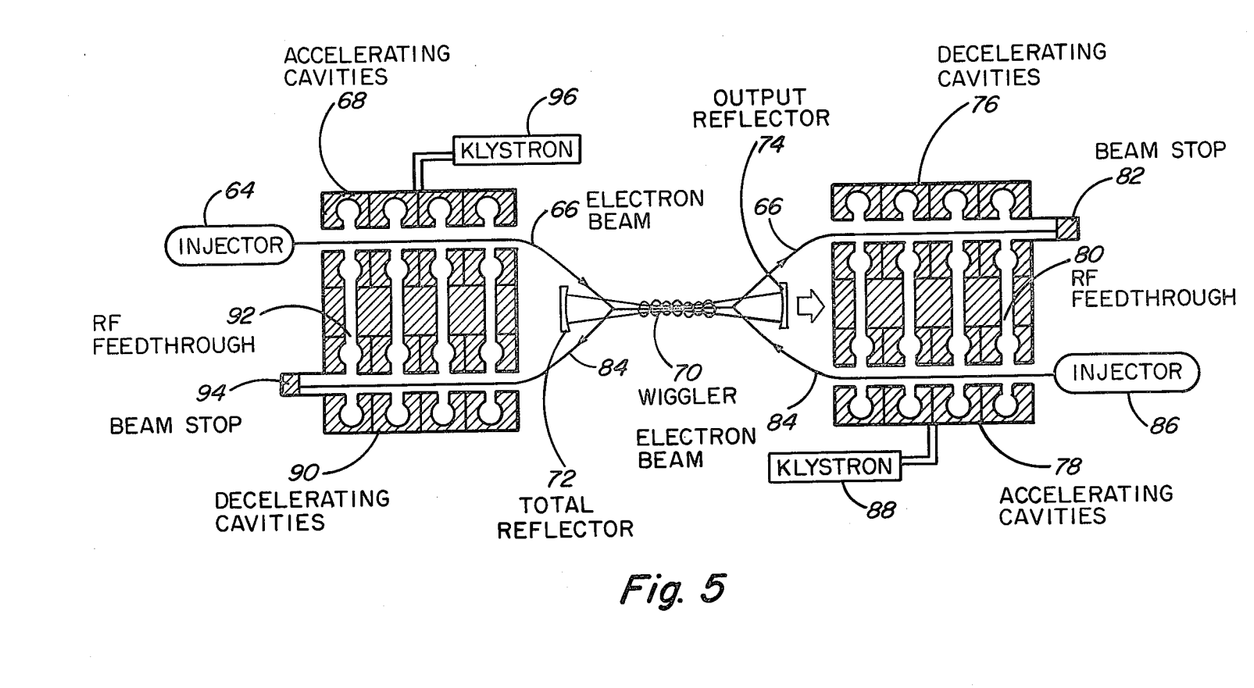
FIG. 5 is a schematic illustration of a pair of dual accelerator/decelerator structures comprising another embodiment of the present invention.

FIG. 5 illustrates an opposed e-beam free electron laser utilizing dual accelerator/decelerator structures. As shown in FIG. 5, injector 64 produces an electron beam 66 which is accelerated by accelerating cavities 68. The electron beam 66 is then directed through wiggler 70, disposed between reflector 72 and output reflector 74, which form the optical resonant cavity of the free electron laser. The electron beam 66 is then directed through decelerating cavities 76 which extract energy from the electron beam 66 in the manner disclosed above. The extracted rf energy is channeled to accelerating cavities 78 via rf feedthrough (resonant coupling cavity) 80. Energy not extracted by decelerating cavities 76 is absorbed in beam stop 82. Rf energy from the decelerating cavities 76 accelerates the electron beam 84 generated by injector 86 together with rf energy produced by klystron 88. Electron beam 84 is then directed through wiggler 70 to decelerating cavities 90 which extract rf energy from electron beam 84. The extracted energy is then applied to accelerating cavities 68 via rf feedthrough (resonant coupling cavity) 92. Energy not extracted from electron beam 84 is absorbed in beam stop 94. Rf energy from rf feedthrough 92 and klystron 96 is used to accelerate the electron beam 66.

The advantage to the configuration disclosed in FIG. 5 is that the distance over which rf feedback energy must be channeled is greatly reduced over that disclosed in the embodiments of FIGS. 1 and 4, which reduces losses of the rf feedback loop. This increases the overall efficiency of the system.

Figure 6:
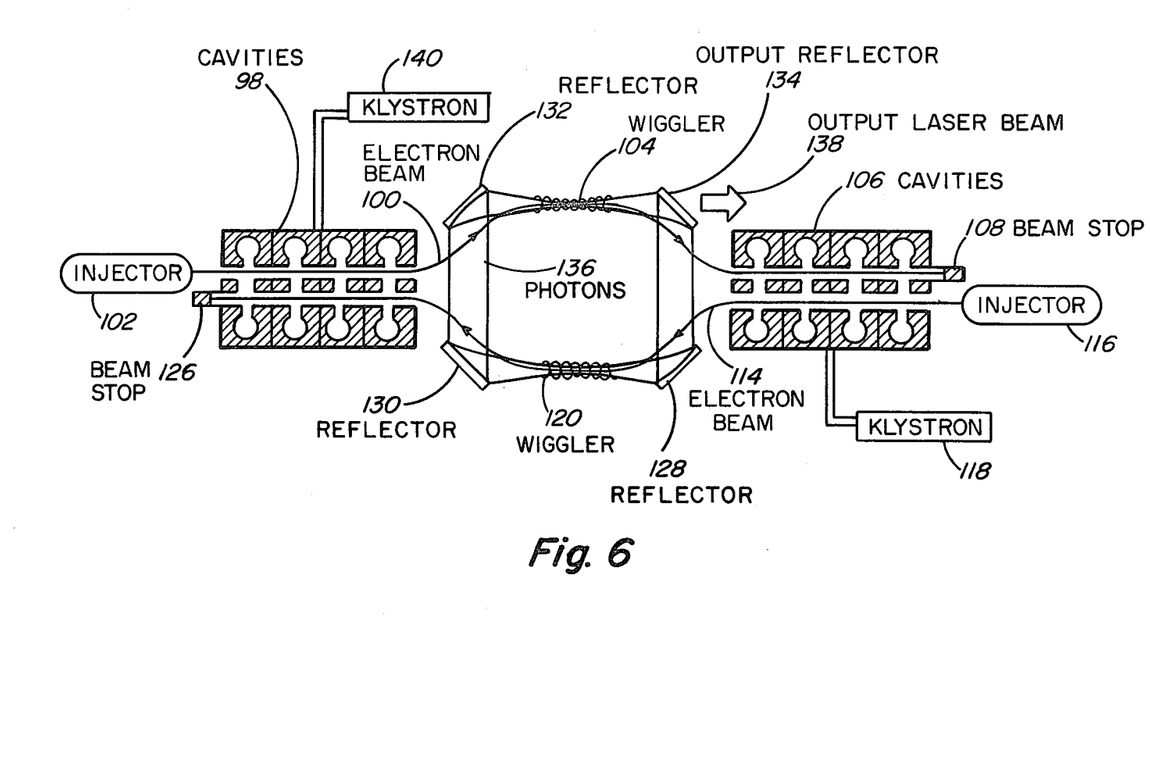
FIG. 6 is a schematic illustration of a pair of combined accelerator/decelerator structures for producing a free electron laser in accordance with another embodiment of the present invention.

FIG. 6 illustrates a combined accelerator/decelerator structure in accordance with the present invention. As shown in FIG. 6, cavities 98 which have two bores through which electron beams may be passed, accelerate electron beam 100 produced by injector 102. Electron beam 100 is directed through wiggler 104 to cavities 106 which decelerate electron beam 100 and extract rf energy. The remaining electrons are absorbed by beam stop 108. Electron beam 114 generated by injector 116 is accelerated in cavities 106 through the second bore by the rf energy extracted from e-beam 100 and generated by klystron 118. Electron beam 114 is then directed through wiggler 120 to the second bore in cavities 98 which decelerate the beam to produce rf energy in cavities 98. Again, energy not extracted from electron beam 114 is absorbed by beam stop 126. Laser photons 136 generated in wigglers 104 and 120 are reflected by reflectors 128, 130 and 132 until they gain sufficient energy to pass through output reflector 134 to produce output laser beam 138. Note that the output reflector 134 as well as other output reflectors disclosed therein can comprise partial reflectors, edge or hole coupled output mirrors, or other reflectors such as disclosed above or known in the art.

The combined accelerator/decelerator structure illustrated in FIG. 6 separates electron beams 100 and 114 for extraction of energy from two separate wigglers 104 and 120. Additionally, the extraction and acceleration of electron beams 100 and 114 is accomplished in two, dual-bore structures, rather than four separate structures, as disclosed in FIG. 5. Although not shown, bending magnets are used in the configuration of FIGS. 5 and 6 to direct the electron beams in the conventional manner disclosed above.

Figure 7:
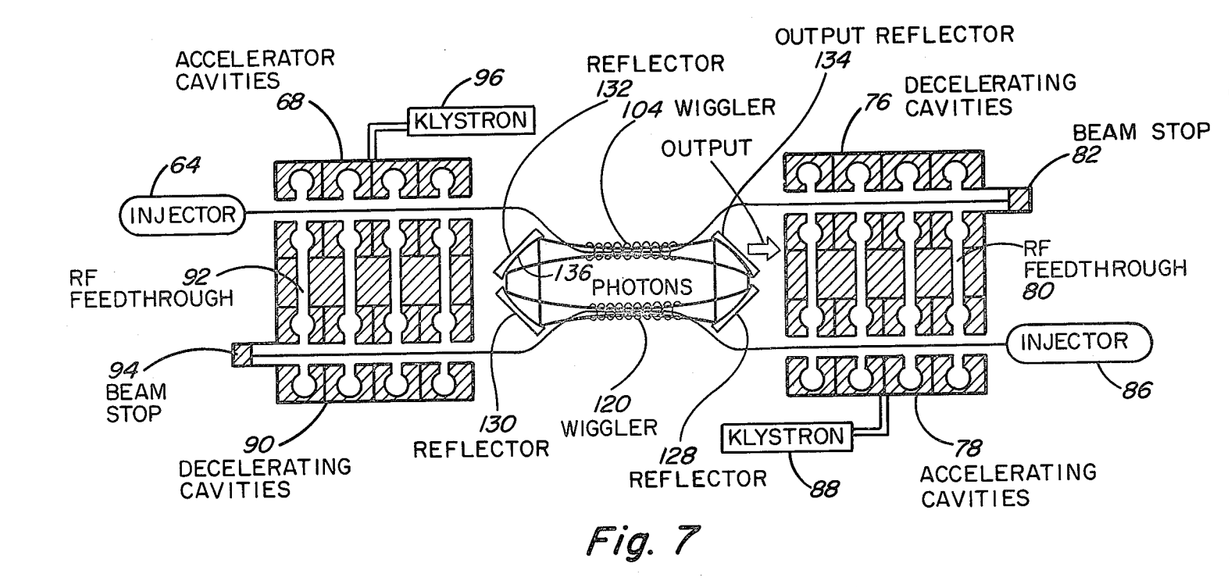
Figure 8:
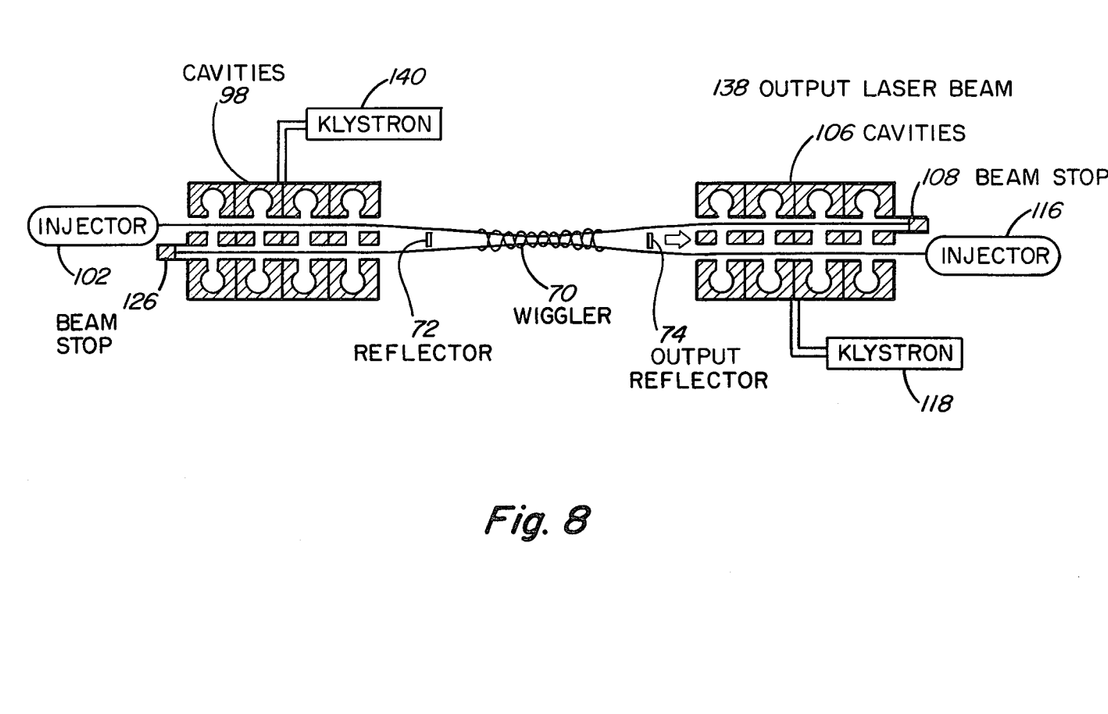

FIG. 7 illustrates the use of the optical cavity configuration of FIG. 6 with the accelerator/decelerator structure of FIG. 5. Similarly, FIG. 8 illustrates the optical cavity configuration of FIG. 5 with the accelerator/decelerator structure of FIG. 6. These structure and cavity configurations are interchangeable as illustrated in FIGS. 5-8, to achieve the desired result.

The present invention therefore provides an improved free electron laser which is capable of producing high output lasing power at high efficiencies. This is accomplished by extracting energy from an accelerated electron beam in the form of rf energy which is used to reduce the required klystron rf energy necessary to accelerate the electron beam. Efficiencies of greater than 20% can be achieved utilizing the various embodiments of the present invention.

The foregoing description of the present invention has been presented for the purposes of illustration and description and it is not intended to be exhaustive or to limit the invention to the precise form disclosed. The foregoing description was chosen and described in order to best explain the principles of the invention and the practical application and to thereby enable others skilled in the art to best utilize the invention and various embodiments and with various modifications as are suited to the particular use contemplated. For example, the microwave cavity structures illustrated in FIGS. 4, 5, and 6 can be replaced with any suitable rf accelerator cavities such as the disk and washer cavity structure disclosed above, on axis coupled or side coupled cavity structures, or any suitable cavity which is capable of accelerating high current electron beams. Additionally, the free electron laser system disclosed above can be operated as an amplifier as well as an oscillator as disclosed above. When utilized in an amplifier configuration, an injection laser is used to provide an optical signal as an outside source at a specified frequency at which the free electron laser amplifier is tuned. For example, the free electron oscillator disclosed above can be used as an injection laser for a free electron laser amplifier. In this manner, high power, high efficiency laser signals can be generated at any desired frequency. Additionally, other types of injection lasers can be used. For example, 1 $\mu$m signals can be generated by HF lasers and mode locked Nd Yag lasers for "pumping" a free electron laser amplifier tuned to amplify 1 $\mu$m signals. It is therefore to be understood that within the scope of the appended claims, the invention may be practiced otherwise than as specifically described, and that subject matter disclosed herein shall not be precluded from being later claimed in the present application, a separate application, or a continuation, continuation-in-part or reissue application.

What is claimed is:

1. An electron beam energy system for a free electron laser comprising:

first cavity means for accelerating a first electron beam;

second cavity means for decelerating said first electron beam and extracting rf energy from said first electron beam;

third cavity means disposed adjacent said second cavity means, said third cavity means for accelerating a second electron beam in response to rf energy generated by said second cavity means by decelerating said first electron beam;

fourth cavity means for decelerating said second electron beam to extract rf energy from said second electron beam, said first cavity means disposed adjacent said fourth cavity means to accelerate said first electron beam in response to said rf energy extracted from said second electron beam by said fourth cavity means;

whereby deposition of said first cavity means adjacent said fourth cavity means and said third cavity means adjacent said second cavity means reduces rf feedthrough losses to enhance efficiency of said electron beam energy system.

2. The electron beam energy system of claim 1 further comprising means for directing said first electron beam and said second electron beam through a single wiggler in a free electron laser system.

3. The electron beam energy system of claim 1 further comprising means for directing said first electron beam and said second electron beam through two separate wigglers in a free electron laser system.

4. The electron beam energy system of claim 1 whereby said two separate wigglers independently generate coherent photons of substantially the same frequency for a single laser optical system.

5. An electron beam energy system for a free electron laser comprising:

first cavity means for accelerating a first electron beam in response to rf energy generated by decelerating a second electron beam in said first cavity means;

second cavity means for accelerating said second electron beam in response to rf energy generated by decelerating said first electron beam in said second cavity means;

whereby said electron beam efficiency is enhanced by accelerating and decelerating said first and second electron beams in both said first and second cavity means.

6. The electron beam energy system of claim 5 further comprising means for directing said first electron beam and said second electron beam through a single wiggler in a free electron laser system.

7. The electron beam energy system of claim 5 further comprising means for directly said first electron beam and said second electron beam through two separate wigglers in a free electron laser system.

8. The electron beam energy system of claim 7 whereby said two separate wigglers independently generate coherent photons of substantially the same frequency for a single laser optical system.

* * * * *